(12) United States Patent
Tamaki et al.

(10) Patent No.: US 9,838,149 B2
(45) Date of Patent: Dec. 5, 2017

(54) WAVELENGTH AND BANDWIDTH ALLOCATION METHOD

(71) Applicant: NIPPON TELEGRAPH AND TELEPHONE CORPORATION, Tokyo (JP)

(72) Inventors: Shinya Tamaki, Yokosuka (JP); Hirotaka Nakamura, Yokosuka (JP); Shunji Kimura, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 27 days.

(21) Appl. No.: 14/360,024

(22) PCT Filed: Dec. 28, 2012

(86) PCT No.: PCT/JP2012/084107
§ 371 (c)(1),
(2) Date: May 22, 2014

(87) PCT Pub. No.: WO2013/108578
PCT Pub. Date: Jul. 25, 2013

(65) Prior Publication Data
US 2014/0334823 A1 Nov. 13, 2014

(30) Foreign Application Priority Data
Jan. 17, 2012 (JP) .................. 2012-007463

(51) Int. Cl.
*H04J 14/00* (2006.01)
*H04J 14/02* (2006.01)
*H04Q 11/00* (2006.01)

(52) U.S. Cl.
CPC ........ *H04J 14/0249* (2013.01); *H04J 14/025* (2013.01); *H04J 14/0246* (2013.01);
(Continued)

(58) Field of Classification Search
None
See application file for complete search history.

(56) References Cited

U.S. PATENT DOCUMENTS

2003/0048805 A1    3/2003 Yoshihara et al.
2004/0037330 A1*   2/2004 Ohkuma ............... 370/535
(Continued)

FOREIGN PATENT DOCUMENTS

CA    2401490 A1    3/2003
CA    2509045 A1    3/2003
(Continued)

OTHER PUBLICATIONS

International Preliminary Report on Patentability dated Jul. 31, 2014 corresponding to PCT/JP2012/084107, 2 pp.
Written Opinion of the International Searching Authority dated Jan. 29, 2013 corresponding to PCT/JP2012/084107, 4 pp.

*Primary Examiner* — Ken N Vanderpuye
*Assistant Examiner* — David Lambert
(74) *Attorney, Agent, or Firm* — Ohlandt, Greeley, Ruggiero & Perle, L.L.P.

(57) ABSTRACT

A wavelength and bandwidth allocation method which includes in order a wavelength determination step S4 of determining a plurality of wavelengths of an uplink signal from each ONU to OLT to guarantee a guaranteed bandwidth corresponding to a subscription service class of each ONU and a reference bandwidth distribution step S5 of distributing, as reference bandwidths, all bandwidths of the plurality of wavelengths determined in the wavelength determination step S4 to each ONU according to the subscription service class of each ONU and making the reference bandwidths of ONUs whose subscription service classes are the same be the same.

12 Claims, 9 Drawing Sheets

(52) U.S. Cl.
CPC ...... *H04J 14/0247* (2013.01); *H04J 14/0252* (2013.01); *H04J 14/0282* (2013.01); *H04Q 11/0067* (2013.01); *H04J 2203/0057* (2013.01); *H04J 2203/0098* (2013.01); *H04Q 2011/0084* (2013.01); *H04Q 2011/0086* (2013.01)

(56) References Cited

U.S. PATENT DOCUMENTS

| | | | |
|---|---|---|---|
| 2006/0127091 A1* | 6/2006 | Yoo et al. ........................ | 398/69 |
| 2007/0019957 A1* | 1/2007 | Kim .................. | H04Q 11/0067 398/72 |
| 2007/0071031 A1* | 3/2007 | Shin et al. .................... | 370/468 |
| 2007/0274339 A1* | 11/2007 | Kim et al. .................... | 370/468 |
| 2009/0175622 A1* | 7/2009 | Lee .................... | H04J 14/0227 398/79 |
| 2012/0321315 A1* | 12/2012 | Timm ................ | H04Q 11/0067 398/67 |

FOREIGN PATENT DOCUMENTS

| | | |
|---|---|---|
| CA | 2509532 A1 | 3/2003 |
| CA | 2665714 A1 | 3/2003 |
| EP | 1292054 A2 | 3/2003 |
| JP | 2003-087282 | 3/2003 |
| JP | 2011-135241 | 7/2011 |
| WO | WO 2011005223 A1 * | 1/2011 |
| WO | 2011092822 A1 | 8/2011 |

\* cited by examiner

WAVELENGTH AND BANDWIDTH ALLOCATION METHOD

BACKGROUND

1. Field of the Disclosure

The present disclosure relates to a wavelength and bandwidth allocation method in WDM/TDM-PON.

2. Discussion of the Background Art

Large-capacity access service is required with the rapid spread of internet. PON (Passive Optical Network) as an optical transmission system of a shared access system in which a transmission bandwidth of a line is shared by a plurality of users is realized, and reduction in cost of an apparatus is advanced, whereby FTTH (Fiber To The Home) service is provided at a realistic price.

By virtue of the realization of the PON, the telecommunications market is continued to be developed; however, the communication capacity of the PON is required to be increased to meet further service requirements of users. However, in PON network, an optical signal used in an uplink signal has a single wavelength, and therefore, when the number of subscribers using the PON network simultaneously increases, the time allocated to one subscriber is reduced, so that there is a problem that the transmission rate is deteriorated. In order to solve this problem, there has been proposed a wavelength variable type WDM/TDM-PON as a network system in which expandability of a total bandwidth is given to PON (TDM-PON) by using another multiplexing technique (WDM) (Patent Literature 1).

CITATION LIST

Patent Literature

Patent Literature 1: Japanese Patent Laid-Open Publication No. 2011-135241

In such an optical communication system, when heavy users requesting a more bandwidth, for example, are charged an additional fee, and thereafter, are shifted to a new wavelength, it is worried that the bandwidth allocated to users continuing to use a former wavelength is unintentionally increased by reducing the number of the heavy users from the former wavelength. This causes inequality between users having paid the additional fee and users not having paid the additional fee. Thus, as in the Patent Literature 1, there has been proposed a method of equally distributing the bandwidth according to a subscription service class of each subscriber.

However, since all bandwidths of a plurality of operated wavelengths are not always used, a wavelength and bandwidth allocation efficiency is lowered. Even if all the bandwidths of the operated wavelengths are used, the bandwidth allocated to subscribers is not necessarily the same, even though the subscription service class of the subscribers is the same, and therefore, an inequality occurs between the subscribers.

When a requirement of one subscriber is small relative to a guaranteed bandwidth and a requirement of the other subscriber is large relative to the guaranteed bandwidth, there is no method of distributing a surplus bandwidth of the one subscriber to the other subscriber. Accordingly, the surplus bandwidth is discarded or allocated to a specified subscriber, for example, and thus there is such a disadvantage that it is impossible to suitably perform such bandwidth allocation that offsets the surplus of the bandwidth and the deficiency of the bandwidth.

Thus, in order to solve that above problem, an object of the present disclosure is to, in a wavelength variable type WDM/TDM-PON, enhance the wavelength and bandwidth allocation efficiency, eliminate an inequality between subscribers, and perform such suitable bandwidth allocation that the surplus of the bandwidth and the deficiency of the bandwidth are offset.

SUMMARY

All bandwidths of a plurality of wavelengths guaranteeing a guaranteed bandwidth corresponding to a subscription service class are distributed as reference bandwidths according to the subscription service class, and, at the same time, when the subscription service class is the same, the reference bandwidth is also the same.

Specifically, the present disclosure is a wavelength and bandwidth allocation method, which, in a passive optical communication network in which a plurality of optical network units (ONUs) are connected to one optical line terminal (OLT), each of the ONUs transmits an uplink signal of any one of a plurality of previously provided wavelengths to the OLT, and the OLT receives the uplink signals of all the previously provided wavelengths from each of the ONUs, is performed by the OLT, and the method includes in order: a wavelength determination step of determining a plurality of wavelengths of the uplink signal from each of the ONUs to the OLT to guarantee a guaranteed bandwidth corresponding to a subscription service class of each of the ONUs; and a reference bandwidth distribution step of distributing, as reference bandwidths, all bandwidths of the plurality of wavelengths determined in the wavelength determination step to each of the ONUs according to the subscription service class of each of the ONUs and making the reference bandwidths of the respective ONUs whose subscription service classes are the same be the same.

According to the above constitution, in a wavelength variable type WDM/TDM-PON, a wavelength and bandwidth allocation efficiency is raised, and an inequality between subscribers can be eliminated.

In addition, the present disclosure is the wavelength and bandwidth allocation method, in which, in the wavelength determination step, a value obtained by multiplying a value, obtained by dividing the bandwidth of one wavelength by the maximum number of the ONUs accommodated by one wavelength, by a weight of the subscription service class of each of the ONUs is the guaranteed bandwidth corresponding to the subscription service class of each of the ONUs.

According to the above constitution, in each of the ONUs the guaranteed bandwidth corresponding to the subscription service class can be at least guaranteed.

In addition, the present disclosure is the wavelength and bandwidth allocation method, in which, in the reference bandwidth distribution step, as the number of the subscription service classes of the respective ONUs increases, the number of the wavelengths having the bandwidth distributed as the reference bandwidth to each of the ONUs increases, and the bandwidth of each wavelength determined in the wavelength determination step is equally distributed to each of the ONUs to which the bandwidth of each wavelength determined in the wavelength determination step is distributed as the reference bandwidth.

In addition, the present disclosure is the wavelength and bandwidth allocation method, in which, in the reference bandwidth distribution step, when the number of the plurality of wavelengths determined in the wavelength determination step is smaller than the number of the subscription service classes of the respective ONUs, the bandwidth of one of the plurality of wavelengths determined in the wavelength determination step is distributed into two or more high-order subscription service classes of the ONUs according to the subscription service class of each of the ONUs.

According to the above constitution, in each ONUs, as the number of the subscription service classes increases, a more reference bandwidth can be allocated, and when the subscription service class is the same, the reference bandwidth can be allocated equally.

A surplus bandwidth to each ONU in which the reference bandwidth is more surplus than a requested bandwidth is distributed to each ONU in which the requested bandwidth is more excess than the reference bandwidth.

Specifically, the present disclosure is the wavelength and bandwidth allocation method including in order after the reference bandwidth distribution step: a bandwidth request acceptance step of accepting a bandwidth request from each of the ONUs; a difference calculation step of calculating a difference between a requested bandwidth and the reference bandwidth of each of the ONUs and calculating a surplus bandwidth of each of the ONUs in which the reference bandwidth is more surplus than the requested bandwidth and an excess bandwidth of each of the ONUs in which the requested bandwidth is more excess than the reference bandwidth.

In addition, the present disclosure is the wavelength and bandwidth allocation method including, after the difference calculation step, a surplus bandwidth distribution step of distributing the surplus bandwidth of each of the ONUs in which the reference bandwidth is more surplus than the requested bandwidth to each of the ONUs in which the requested bandwidth is more excess than the reference bandwidth.

According to the above constitution, in the wavelength variable type WDM/TDM-PON, such suitable bandwidth allocation that a surplus of the bandwidth and a deficiency of the bandwidth are offset can be performed.

In addition, the present disclosure is the wavelength and bandwidth allocation method, in which, in the surplus bandwidth distribution step, the surplus bandwidth of each of the ONUs in which the reference bandwidth is more surplus than the requested bandwidth is equally distributed to each of the ONUs in which the requested bandwidth is more excess than the reference bandwidth.

According to the above constitution, the surplus bandwidth can be distributed regardless of a difference between the reference bandwidth and the requested bandwidth and the subscription service class.

In addition, the present disclosure is the wavelength and bandwidth allocation method, in which, in the surplus bandwidth distribution step, the higher the subscription service class, the more the surplus bandwidth of each of the ONUs in which the reference bandwidth is more surplus than the requested bandwidth is distributed to each of the ONUs in which the requested bandwidth is more excess than the reference bandwidth.

According to the above constitution, as the subscription service class becomes higher, more surplus bandwidth can be distributed to each ONU.

In addition, the present disclosure is the wavelength and bandwidth allocation method, in which, in the surplus bandwidth distribution step, as the requested bandwidth becomes more excess than the reference bandwidth, the more surplus bandwidth of each of the ONUs in which the reference bandwidth is more surplus than the requested bandwidth is distributed to each of the ONUs in which the requested bandwidth is more excess than the reference bandwidth.

According to the above constitution, as the difference between the reference bandwidth and the requested bandwidth increases, the more surplus bandwidth can be distributed to each ONU.

According to the present disclosure, in a wavelength variable type WDM/TDM-PON, a wavelength and bandwidth allocation efficiency is enhanced, an inequality between subscribers is eliminated, and such suitable bandwidth allocation that a surplus of the bandwidth and a deficiency of the bandwidth are offset can be performed.

DETAILED DESCRIPTION OF THE PREFERRED EMBODIMENT

Figure 1:
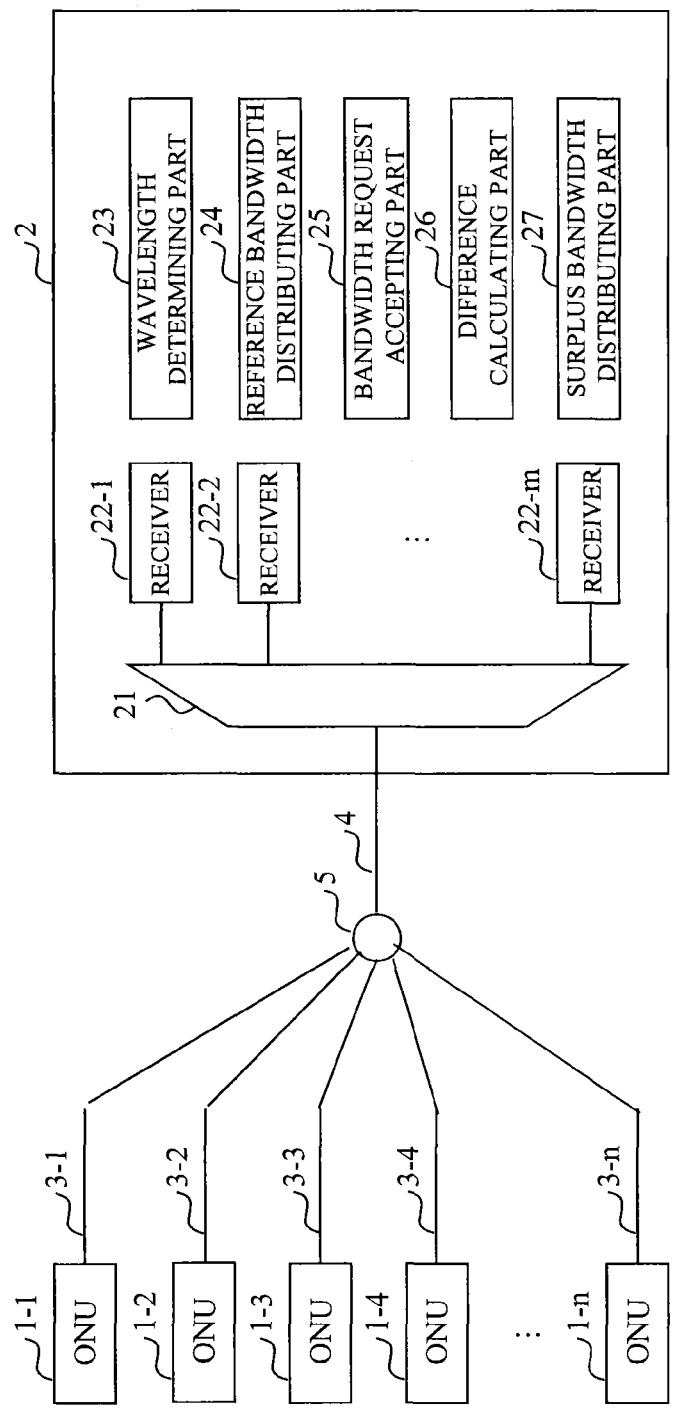
FIG. 1 is a view showing a configuration of a PON of the present disclosure.

Hereinafter, an embodiment of the present disclosure will be described with reference to the accompanying drawings. The embodiment to be described below is an example of practicing the present disclosure and is not limited to the following embodiments. Components denoted by the same reference numerals in the present specification and the drawings mutually denote the same components.

(Summary of Wavelength and Bandwidth Allocation Method)

Figure 2:
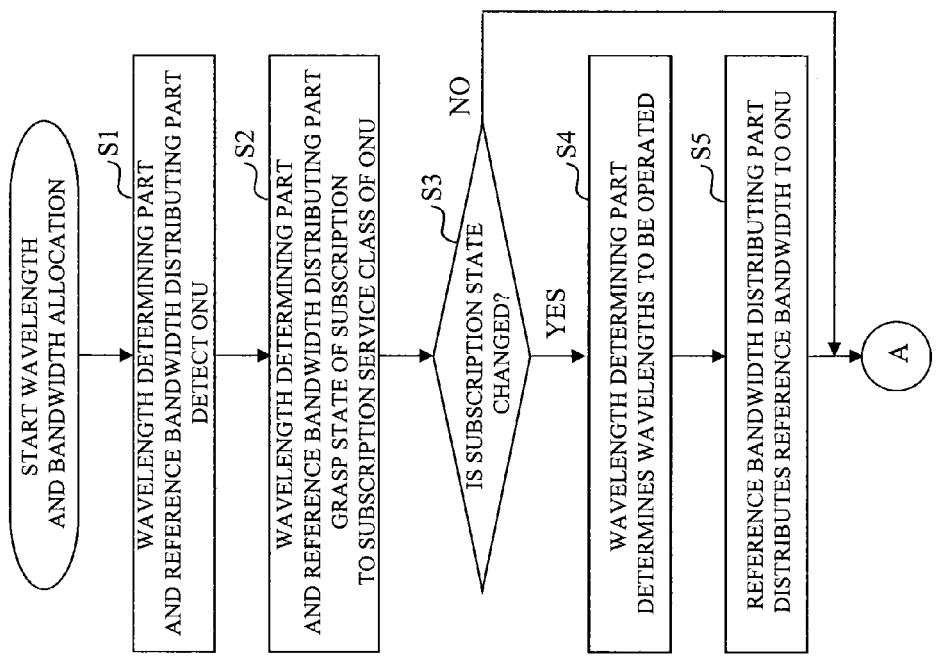
FIG. 2 is a flow chart showing a wavelength and bandwidth allocation method of this disclosure.
Figure 3:
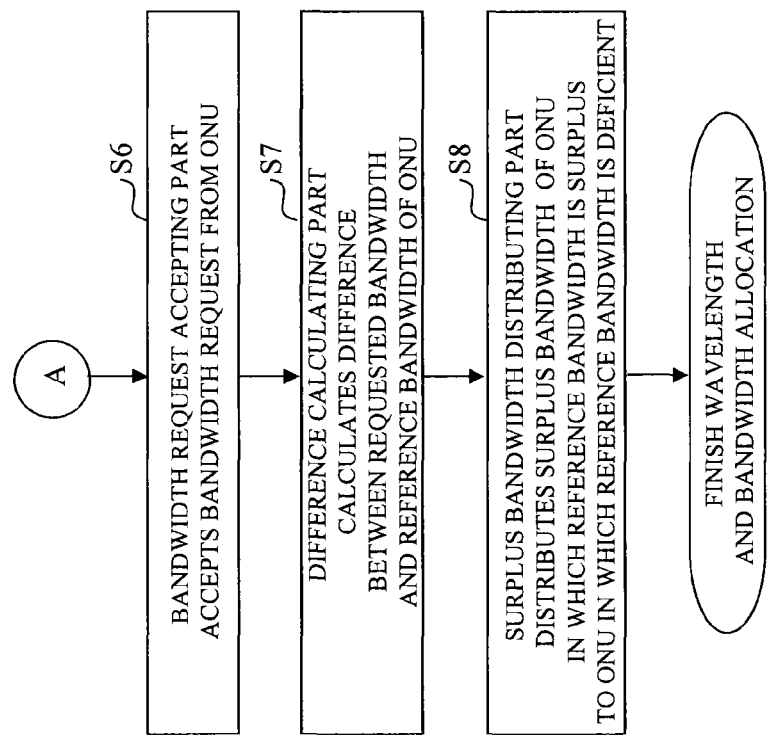
FIG. 3 is a flow chart showing the wavelength and bandwidth allocation method of this disclosure.

FIG. 1 shows a configuration of a PON of the present disclosure. FIGS. 2 and 3 show flow charts showing a wavelength and bandwidth allocation method of this disclosure.

The PON is constituted of n (n is a plural number) ONUs 1-1, 1-2, 1-3, 1-4, . . . , and 1-n, an OLT 2, n transmission paths 3-1, 3-2, 3-3, 3-4, . . . , and 3-n, a transmission path 4, and a power splitter 5.

The OLT 2 is constituted of a wavelength filter 21, m (m is a plural number) receivers 22-1, 22-2, . . . , and 22-m, a wavelength determining part 23, a reference bandwidth distributing part 24, a bandwidth request accepting part 25, a difference calculating part 26, and a surplus bandwidth distributing part 27.

Each of the ONUs 1 transmits an uplink signal of any one of a plurality of previously provided wavelengths $\lambda_1, \ldots,$ and $\lambda_m$ to the OLT 2. The OLT 2 receives the uplink signals of all the previously provided wavelengths $\lambda_1, \ldots,$ and $\lambda_m$ from each of the ONUs 1. The transmission paths 3-1, . . . , and 3-n connect the ONUs 1-1, . . . , and 1-n and the power splitter 5. The transmission path 4 connects the OLT 2 and the power splitter 5.

The wavelength filter 21 sorts the uplink signals from the respective ONUs 1 to the OLT 2 into optical signals having wavelengths $\lambda_1, \ldots,$ and $\lambda_m$. The receivers 22-1, ..., and 22-m receive the optical signals having wavelengths $\lambda_1, \ldots,$ and $\lambda_m$, respectively. Each of the receivers 22 is an LC (Line Card) or the like. The WDM/TDM-PON is configured thus as described above.

When the sum of a bandwidth demand is small, the number of the operated receivers 22 is minimized (for example, one). The number of the operated receivers 22 is increased according to an increase in the number of users and an increase in demand of some users, and users who cannot be accommodated in an existing receiver 22 are accommodated in a new receiver 22. The sum of the bandwidth brought by the operated receiver 22 is virtually regarded as a collective total bandwidth of the PON, and the bandwidth is distributed to each of the ONUs 1.

The wavelength determining part 23 determines a plurality of wavelengths of the uplink signals from the respective ONUs 1 to the OLT 2 to guarantee a guaranteed bandwidth corresponding to a subscription service class of each of the ONUs 1 (step S4). The reference bandwidth distributing part 24 distributes, as the reference bandwidths, all the bandwidths of a plurality of the wavelengths determined by the wavelength determining part 23 to each of the ONUs 1 according to the subscription service class of each of the ONUs 1 and makes the reference bandwidths of the ONUs 1 whose subscription service classes are the same be the same (step S5).

The wavelength determining part 23 and the reference bandwidth distributing part 24 detect each of the ONUs 1 (step S1) prior to steps S4 and S5 and grasp a state of subscription to the subscription service class of each of the ONUs 1 (step S2). When the subscription state changes (YES in step S3), steps S4 and S5 are executed. When the subscription state does not change (NO in step S3), steps S4 and S5 are not required to be executed.

The bandwidth request accepting part 25 accepts a bandwidth request from each of the ONUs 1 (step S6). The difference calculating part 26 calculates a difference between a requested bandwidth and a reference bandwidth of each of the ONUs 1 and calculates a surplus bandwidth of each of the ONUs 1 in which the reference bandwidth is more surplus than the requested bandwidth and an excess bandwidth of each of the ONUs 1 in which the requested bandwidth is more excess than the reference bandwidth (step S7). The surplus bandwidth distributing part 27 distributes the surplus bandwidth of each of the ONUs 1 in which the reference bandwidth is more surplus than the requested bandwidth to each of the ONUs 1 in which the requested bandwidth is more excess than the reference bandwidth (step S8).

In accordance with step S4 executed by the wavelength determining part 23 and step S5 executed by the reference bandwidth distributing part 24, in the wavelength variable type WDM/TDM-PON, a wavelength and bandwidth allocation efficiency is enhanced, an inequality between subscribers can be eliminated. In accordance with step S8 executed by the surplus bandwidth distributing part 27, in the wavelength variable type WDM/TDM-PON, such suitable bandwidth allocation that a surplus of the bandwidth and a deficiency of the bandwidth are offset can be performed.

(Details of Wavelength Determination Step)

Figure 4:
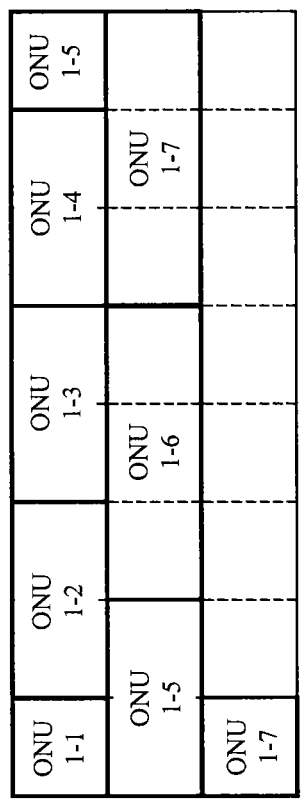
FIG. 4 is a view showing details of a wavelength determining step.

The details of the wavelength determination step S4 are shown in FIG. 4. As the ONUS 1, ONUs 1-1, ..., and 1-7 are arranged. The subscription service classes of the ONUs 1-1, ..., and 1-7 are classes 1, 2, 2, 2, 3, 3, and 4, respectively. The maximum number of the ONUs 1 accommodated by one receiver 22 is eight. The bandwidth of one receiver 22 is 1.

In the wavelength determining part 23, a value obtained by multiplying a value 1/8, obtained by dividing the bandwidth 1 of one wavelength $\lambda$, by the maximum number 8 of the ONU 1 accommodated by one wavelength $\lambda$, by a weight of the subscription service class of each of the ONUs 1 is the guaranteed bandwidth corresponding to the subscription service class of each of the ONUs 1. In the wavelength determining part 23, the guaranteed bandwidths corresponding to the subscription service classes of the ONUs 1-1, ..., and 1-7 are 1/8, 2/8, 2/8, 2/8, 3/8, 3/8, and 4/8, respectively.

A total of the guaranteed bandwidths corresponding to the subscription service classes of the ONUs 1-1, ..., and 1-7 is 17/8 and is guaranteed by three wavelengths $\lambda$ of the uplink signal from each of the ONUs 1 to the OLT 2. Thus, the receivers 22-1, 22-2, and 22-3 receiving optical signals having wavelengths $\lambda_1, \lambda_2$ and $\lambda_3$, respectively are operated. For example, the receiver 22-1 accommodates the ONUs 1-1, ..., and 1-5 (with respect to the ONU 1-5, the bandwidth 1/8 is accommodated), the receiver 22-2 accommodates the ONUs 1-5, ..., and 1-7 (with respect to the ONU 1-5, the bandwidth 2/8 is accommodated, and with respect to the ONU 1-7, the bandwidth 3/8 is accommodated), and the receiver 22-3 accommodates the ONU 1-7 (accommodates the bandwidth 1/8). In this case, the receiver 22-3 can afford to accommodate a bandwidth 7/8. Thus, the reference bandwidth distribution step S5 is executed.

(Details of Reference Bandwidth Distribution Step)

Figure 5:
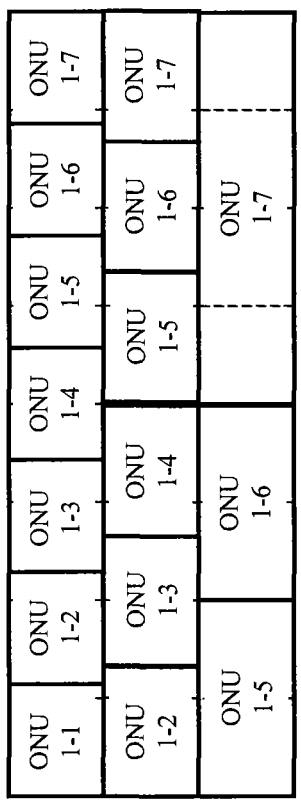
FIG. 5 is a view showing details of a reference bandwidth distribution step.

The details of the reference bandwidth distribution step S5 are shown in FIG. 5. As the number of the subscription service classes of the respective ONUs 1 increases, the number of the wavelengths $\lambda$ having the bandwidth distributed as the reference bandwidth to each of the ONUs 1 increases. This is based on the idea that although the existing wavelength $\lambda$ may accommodate each of the ONUs 1 of a low-order subscription service class, a new wavelength $\lambda$ should accommodate only each of the ONUs 1 of a high-order subscription service class. Specifically, a wavelength $\lambda_k$ accommodates only each of the ONUs 1, where the subscription service class is not less than k. Namely, a wavelength $\lambda_1$ accommodates each of the ONUs 1-1, ..., and 1-7, where the subscription service class is not less than 1, a wavelength $\lambda_2$ accommodates each of the ONUs 1-2, ..., and 1-7, where the subscription service class is not less than 2, and a wavelength $\lambda_3$ accommodates each of the ONUs 1-5, ..., and 1-7, where the subscription service class is not less than 3.

The bandwidth of each of the wavelengths $\lambda$ determined in the wavelength determination step S4 is equally distributed to each of the ONUs 1 to which the bandwidth of each of the wavelengths $\lambda$ determined in the wavelength determination step S4 is distributed as the reference bandwidth. Namely, the bandwidth of the wavelength $\lambda_1$ is equally distributed into each of the ONUs 1-1, ..., and 1-7, and the bandwidth of the wavelength $\lambda_2$ is equally distributed into each of the ONUs 1-2, ..., and 1-7. However, the bandwidth of the wavelength $\lambda_3$ is gradient-distributed into each of the ONUs 1-5, 1-6, and 1-7 to discriminate the respective subscription service classes 3, 3, and 4 of the ONUs 1-5, 1-6, and 1-7.

When the number of a plurality of the wavelengths λ determined in the wavelength determination step S4 is smaller than the number of the subscription service classes of the respective ONUs 1, the bandwidth of one of the wavelengths λ determined in the wavelength determination step S4 is distributed into two or more high-order subscription service classes of the ONUs 1 according to the subscription service class of each of the ONUs 1. Specifically, the number of the wavelengths λ determined in the wavelength determination step S4 is 3, and the number of the subscription service classes of the ONUs 1 is 4, and the former is smaller than the latter. Thus, the bandwidth of the wavelength $\lambda_3$ is distributed into the two high-order subscription service classes 3 and 4 of the ONUs 1-5, 1-6, and 1-7 according to the respective subscription service classes 3, 3, and 4 of the ONUs 1-5, 1-6, and 1-7.

A distribution ratio to the ONUs 1-5, 1-6, and 1-7 may be 3:3:4 faithfully to each subscription service class, may be 1:1:2, for example, in order to further discriminate the subscription service classes, or may be another ratio. In FIG. 5, the distribution ratio to the ONUs 1-5, 1-6, and 1-7 is 1:1:2.

The reference bandwidth of the ONU 1-1 is 1/7=0.143, the reference bandwidth of the ONU 1-2, 1-3, and 1-4 is 1/7+1/6=0.310, the reference bandwidth of the ONU 1-5 and 1-6 is 1/7+1/6+1/(1+1+2)=0.560, and the reference bandwidth of the ONU 1-7 is 1/7+1/6+2/(1+1+2)=0.810.

The guaranteed bandwidth shown in FIG. 4 is a guaranteed bandwidth on the subscription service class. The reference bandwidth shown in FIG. 5 is a virtual guaranteed bandwidth in the number at a certain time point of the operated receiver 22 and the state of subscription to the subscription service class of each of the ONUs 1 at a certain time point. In the guaranteed bandwidth, the bandwidths of all the operated receivers 22 cannot be effectively used; however, in the reference bandwidth, the bandwidths of all the operated receivers 22 can be used maximally.

(Details of Difference Calculating Step)

Figure 6:
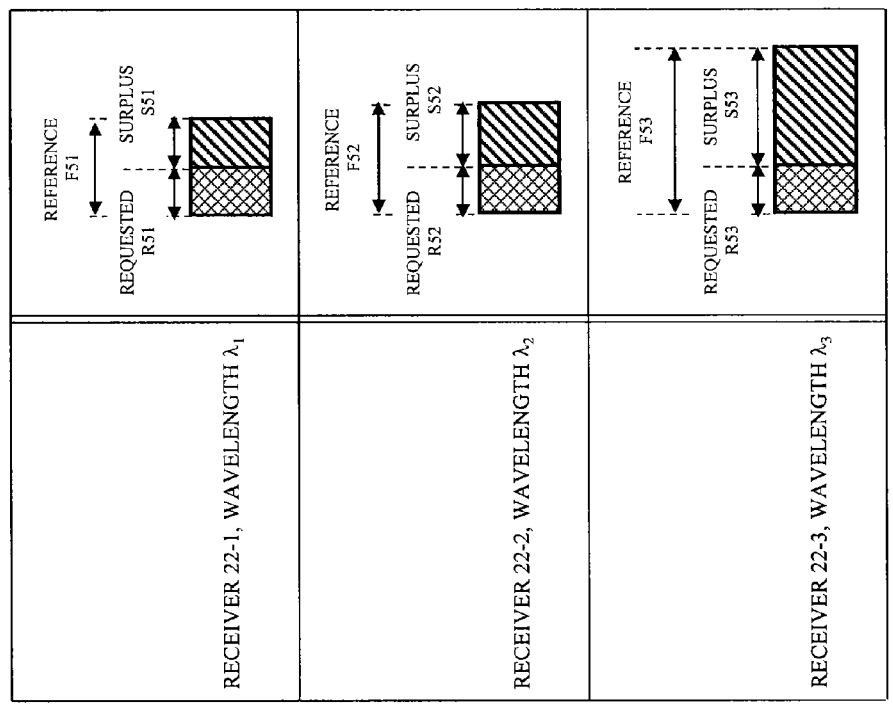
FIG. 6 is a view showing details of a difference calculating step.
Figure 7:
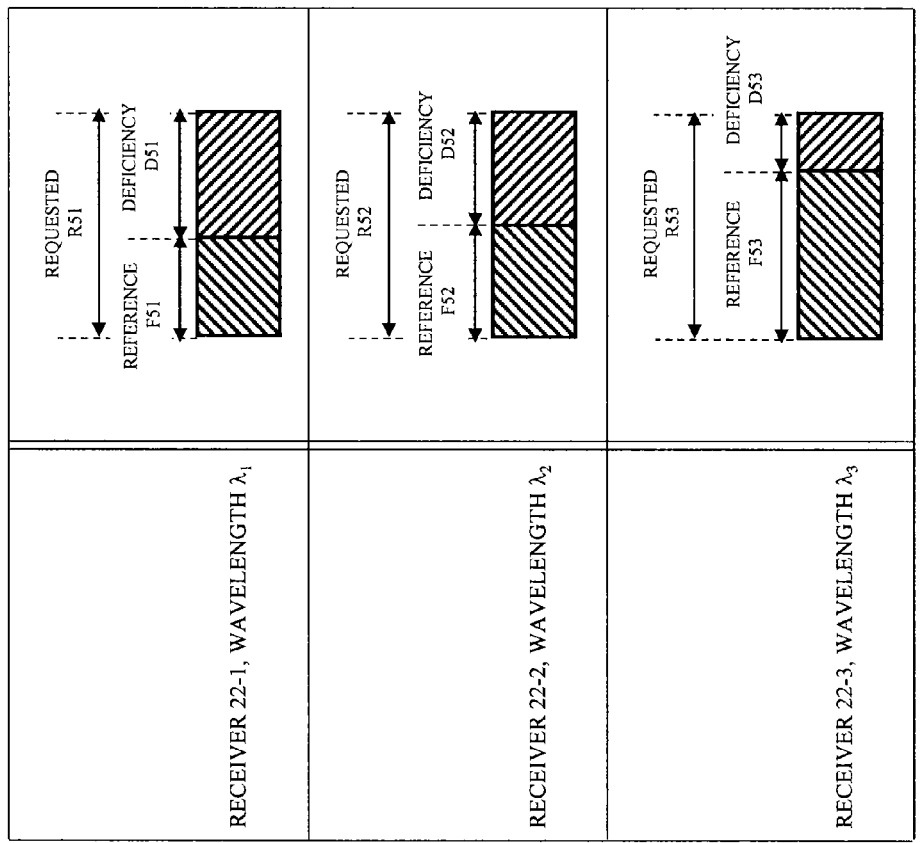
FIG. 7 is a view showing details of the difference calculating step.

The details of the difference calculating step S7 are shown in FIGS. 6 and 7. Each of the ONUs 1 does not always request a bandwidth equal to the reference bandwidth and may request a bandwidth less than the reference bandwidth or a bandwidth more than the reference bandwidth.

FIG. 6 shows the case where the requested bandwidth is less than the reference bandwidth in ONU 1-5. The entire reference bandwidth is distributed as reference bandwidths F51, F52, and F53 to the wavelengths $\lambda_1$, $\lambda_2$ and $\lambda_3$, respectively. The entire request bandwidth is equally distributed as requested bandwidths R51, R52, and R53 to the wavelengths $\lambda_1$, $\lambda_2$ and $\lambda_3$ respectively. Consequently, surplus bandwidths S51, S52, and S53 are produced in the wavelengths $\lambda_1$, $\lambda_2$ and $\lambda_3$, respectively.

FIG. 7 shows the case where the requested bandwidth is more than the reference bandwidth in ONU 1-5. The entire reference bandwidth is distributed as reference bandwidths F51, F52, and F53 to the wavelengths $\lambda_1$, $\lambda_2$ and $\lambda_3$, respectively. The entire request bandwidth is equally distributed as requested bandwidths R51, R52, and R53 to the wavelengths $\lambda_1$, $\lambda_2$ and $\lambda_3$ respectively. Consequently, deficiency bandwidths D51, D52, and D53 are produced in the wavelengths $\lambda_1$, $\lambda_2$ and $\lambda_3$, respectively.

(Details of Surplus Bandwidth Distribution Step)

Figure 8:
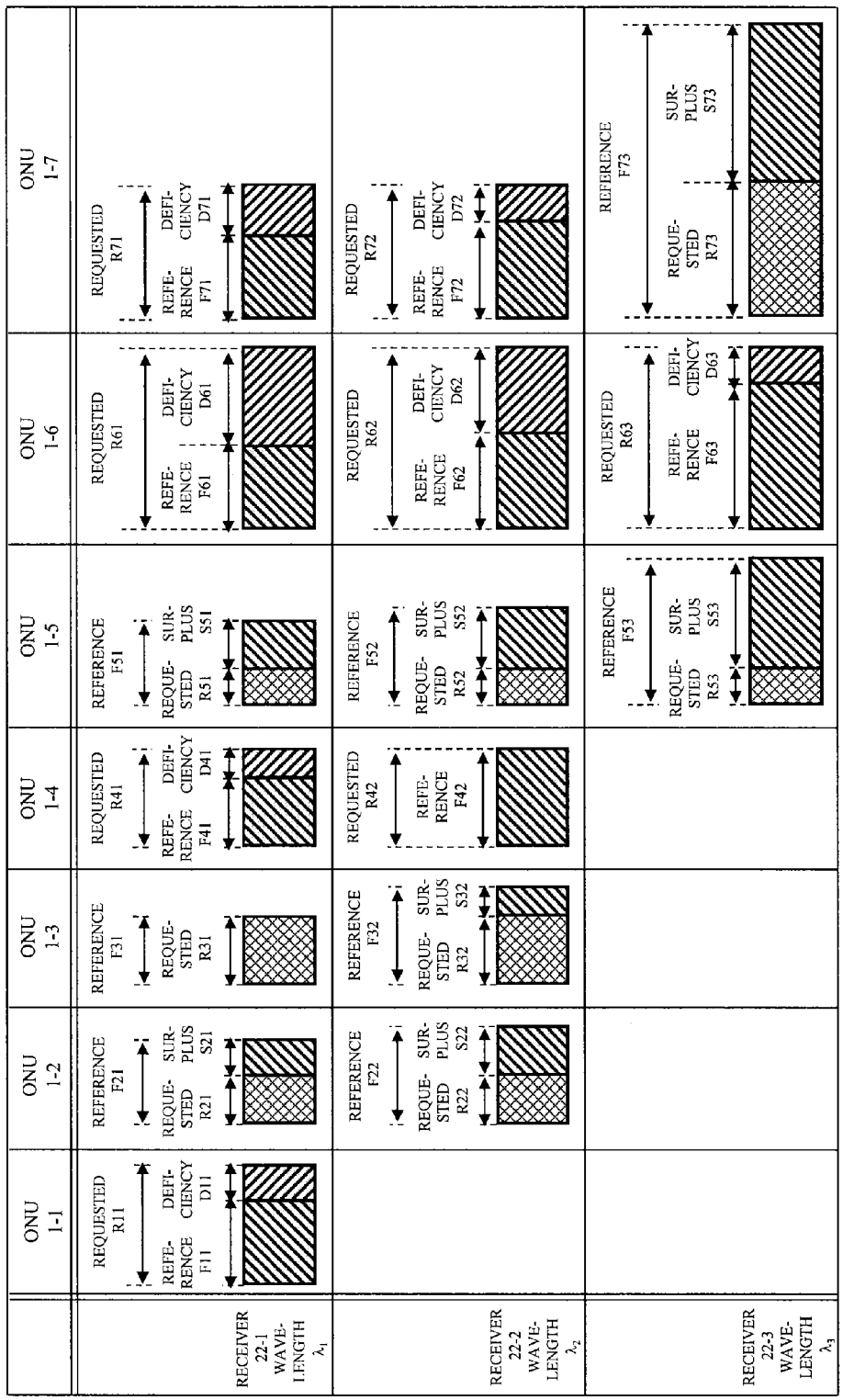
FIG. 8 is a view showing details of a first surplus bandwidth distribution step.
Figure 9:
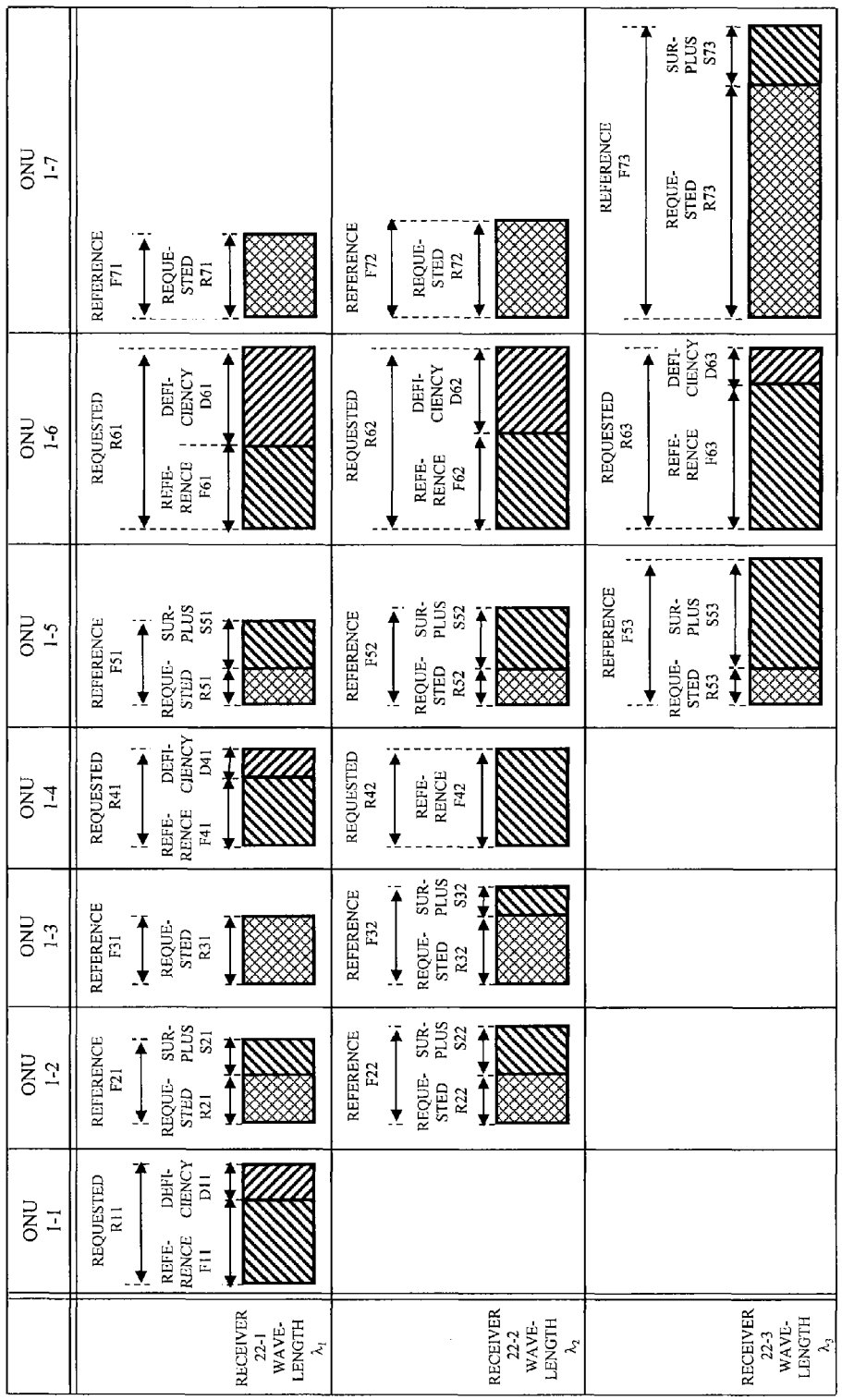
FIG. 9 is a view showing details of a second surplus bandwidth distribution step.

The details of the surplus bandwidth distribution step S8 are shown in FIGS. 8 and 9. In FIGS. 8 and 9, the reference bandwidths to the wavelengths $\lambda_1$, $\lambda_2$ and $\lambda_3$ in each of the ONUs 1 are the reference bandwidth shown in FIG. 5. In FIGS. 8 and 9, the requested bandwidths to the wavelengths $\lambda_1$, $\lambda_2$ and $\lambda_3$ in each of the ONUs 1-1, . . . , and 1-6 are the same; however, the requested bandwidths to the wavelengths $\lambda_1$, $\lambda_2$ and $\lambda_3$ in the ONU 1-7 are different. First, FIG. 8 will be described, and then FIG. 9 will be described.

FIG. 8 will be described. Reference bandwidths F11, F21, F31, F41, F51, F61, and F71 to the wavelength $\lambda_1$ in the respective ONUs 1-1, . . . , and 1-7 are 0.143. Reference bandwidths F22, F32, F42, F52, F62, and F72 to the wavelength $\lambda_2$ in the respective ONUs 1-2, . . . , and 1-7 are 0.167. Reference bandwidths F53 and F63 to the wavelength $\lambda_3$ in the respective ONUs 1-5 and 1-6 are 0.250. A reference bandwidth F73 to the wavelength $\lambda_3$ in the ONU 1-7 are 0.500.

The entire requested bandwidths in the ONUs 1-1, . . . , and 1-7 are 0.200, 0.200, 0.286, 0.334, 0.300, 1.000, and 0.700, respectively. The entire requested bandwidth in the ONU 1-1 is distributed as a requested bandwidth R11 (=0.200) to the wavelength $\lambda_1$. The entire requested bandwidth in the ONU 1-2 is equally distributed as requested bandwidths R21 and R22 (=0.100) to the wavelengths $\lambda_1$ and $\lambda_2$, respectively. The entire requested bandwidth in the ONU 1-3 is equally distributed as requested bandwidths R31 and R32 (=0.143) to the wavelengths $\lambda_1$ and $\lambda_2$, respectively. The entire requested bandwidth in the ONU 1-4 is equally distributed as requested bandwidths R41 and R42 (=0.167) to the wavelengths $\lambda_1$ and $\lambda_2$, respectively. The entire requested bandwidth in the ONU 1-5 is equally distributed as requested bandwidths R51, R52, and R53 (=0.100) to the wavelengths $\lambda_1$, $\lambda_2$, and $\lambda_3$, respectively. The entire requested bandwidth in the ONU 1-6 is equally distributed as requested bandwidths R61, R62, and R63 (=0.333) to the wavelengths $\lambda_1$, $\lambda_2$, and $\lambda_3$, respectively. The entire requested bandwidth in the ONU 1-7 is equally distributed as requested bandwidths R71, R72, and R73 (=0.233) to the wavelengths $\lambda_1$, $\lambda_2$, and $\lambda_3$, respectively.

A deficiency bandwidth D11 to the wavelengths $\lambda_1$ in the ONU 1-1 is 0.057. Surplus bandwidths S21 and S22 to the wavelengths $\lambda_1$ and $\lambda_2$ in the ONU 1-2 are 0.043 and 0.067, respectively. A surplus bandwidth S32 to the wavelength $\lambda_2$ in the ONU 1-3 is 0.024. The reference bandwidth F31 and the requested bandwidth R31 to the wavelength $\lambda_1$ in the ONU 1-3 are equal to each other, and there is no surplus and deficiency in the bandwidth. A deficiency bandwidth D41 to the wavelength $\lambda_1$ in the ONU 1-4 is 0.024. The reference bandwidth F42 and the requested bandwidth R42 to the wavelength $\lambda_2$ in the ONU 1-4 are equal to each other, and there is no surplus and deficiency in the bandwidth. The surplus bandwidths S51, S52, and S53 to the wavelengths $\lambda_1$, $\lambda_2$, and $\lambda_3$ in the ONU 1-5 are 0.043, 0.067, and 0.150, respectively. Deficiency bandwidths D61, D62, and D63 to the wavelengths $\lambda_1$, $\lambda_2$, and $\lambda_3$ in the ONU 1-6 are 0.190, 0.166, and 0.083, respectively. Deficiency bandwidths D71 and D72 and a surplus bandwidth S73 to the wavelengths $\lambda_1$, $\lambda_2$, and $\lambda_3$ in the ONU 1-7 are 0.090, 0.066, and 0.267, respectively.

The wavelength $\lambda_1$ will be described. The sum of the surplus bandwidths S21 and S51 in the ONUs 1-2 and 1-5 is 0.086. The sum of the deficiency bandwidths D11, D41, D61, and D71 in the ONUs 1-1, 1-4, 1-6, and 1-7 is 0.361. Since the sum of the surplus bandwidths is smaller than the sum of the deficiency bandwidths, the surplus bandwidth cannot compensate the deficiency bandwidth. Thus, the sum of the surplus bandwidths is equally distributed as an additional bandwidth (=0.022) to the ONUs 1-1, 1-4, 1-6, and 1-7. Since the additional bandwidth is less than the deficiency bandwidth in each of the ONUs 1-1, 1-4, 1-6, and 1-7, the additional bandwidth is permitted. Thus, the actual bandwidths in the ONUs 1-1, . . . , and 1-7 are 0.165, 0.100, 0.143, 0.165, 0.100, 0.165, and 0.165, respectively.

The wavelength $\lambda_2$ will be described. The sum of the surplus bandwidths S22, S32, and S52 in the ONUs 1-2, 1-3, and 1-5 is 0.158. The sum of the deficiency bandwidths D62 and D72 in the ONUs 1-6 and 1-7 is 0.232. Since the sum of the surplus bandwidths is smaller than the sum of the deficiency bandwidths, the surplus bandwidth cannot compensate the deficiency bandwidth. Thus, the sum of the surplus bandwidths is equally distributed as the additional bandwidth (=0.079) to the ONUs 1-6 and 1-7. However, since the additional bandwidth is more than the deficiency bandwidth in the ONU 1-7, the deficiency bandwidth D72 is permitted as the additional bandwidth. 0.158−0.066=0.092 as the additional bandwidth is permitted in the ONU 1-6, and the additional bandwidth is less than the deficiency bandwidth. Thus, the actual bandwidths in the ONUs 1-2, . . . , and 1-7 are 0.100, 0.143, 0.167, 0.100, 0.259, and 0.233, respectively.

The wavelength $\lambda_3$ will be described. The sum of the surplus bandwidths S53 and S73 in the ONUs 1-5 and 1-7 is 0.417. The deficiency bandwidth D63 in the ONU 1-6 is 0.083. Since the sum of the surplus bandwidths is larger than the sum of the deficiency bandwidths, the surplus bandwidth can compensate the deficiency bandwidth. Thus, the deficiency bandwidth D63 as the additional bandwidth is permitted in the ONU 1-6. Accordingly, the actual bandwidths in the ONUs 1-5, . . . , and 1-7 are 0.100, 0.333, and 0.233, respectively.

FIG. 9 will be described. The reference bandwidth to each of the ONUs 1 is similar to each other in FIGS. 8 and 9. The entire requested bandwidth in each of the ONUs 1 is similar to each other in FIGS. 8 and 9. In FIG. 9, the entire requested bandwidth in each of the ONUs 1-1, . . . , and 1-6 is distributed in a similar manner to FIG. 8. However, the entire requested bandwidth in the ONU 1-7 is distributed as the requested bandwidths R71 (=0.143), R72 (=0.167), and R73 (=0.390) to the wavelengths $\lambda_1$, $\lambda_2$, and $\lambda_3$, respectively. Namely, the entire requested bandwidth in the ONU 1-7 is first compensated by the reference bandwidth F71 to the wavelength $\lambda_1$, then compensated by the reference bandwidth F72 to the wavelength $\lambda_2$, and then compensated by the reference bandwidth F73 to the wavelength $\lambda_3$.

The surplus bandwidth or the deficiency bandwidth to each of the ONUs 1-1, . . . , and 1-6 is similar to each other in FIGS. 8 and 9. The reference bandwidth F71 and the requested bandwidth R71 to the wavelength $\lambda_1$ in the ONU 1-7 are equal to each other, and there is no surplus and deficiency in the bandwidth. The reference bandwidth F72 and the requested bandwidth R72 to the wavelength $\lambda_2$ in the ONU 1-7 are equal to each other, and there is no surplus and deficiency in the bandwidth. The surplus bandwidth S73 to the wavelength $\lambda_3$ in the ONU 1-7 is 0.110.

The wavelength $\lambda_1$ will be described. The sum of the surplus bandwidths S21 and S51 in the ONUs 1-2 and 1-5 is 0.086. The sum of the deficiency bandwidths D11, D41, and D61 in the ONUs 1-1, 1-4, and 1-6 is 0.271. Since the sum of the surplus bandwidths is smaller than the sum of the deficiency bandwidths, the surplus bandwidth cannot compensate the deficiency bandwidth. Thus, the sum of the surplus bandwidths is equally distributed as the additional bandwidth (=0.029) to the ONUs 1-1, 1-4, and 1-6. However, since the additional bandwidth is more than the deficiency bandwidth in the ONU 1-4, the deficiency bandwidth D41 is permitted as the additional bandwidth. (0.086−0.024)/2=0.031 as the additional bandwidth is permitted in each of the ONUs 1-1 and 1-6, and the additional bandwidth is less than the deficiency bandwidth. Thus, the actual bandwidths in the ONUs 1-1, . . . , and 1-7 are 0.174, 0.100, 0.143, 0.167, 0.100, 0.174, and 0.143, respectively.

The wavelength $\lambda_2$ will be described. The sum of the surplus bandwidths S22, S32, and S52 in the ONUs 1-2, 1-3, and 1-5 is 0.158. The deficiency bandwidth D62 in the ONU 1-6 is 0.166. Since the sum of the surplus bandwidths is smaller than the sum of the deficiency bandwidths, the surplus bandwidth cannot compensate the deficiency bandwidth. Thus, the sum of the surplus bandwidths is distributed as the additional bandwidth (=0.158) to the ONU 1-6. Thus, the actual bandwidths in the ONUs 1-2, . . . , and 1-7 are 0.100, 0.143, 0.167, 0.100, 0.325, and 0.167, respectively.

The wavelength $\lambda_3$ will be described. The sum of the surplus bandwidths S53 and S73 in the ONUs 1-5 and 1-7 is 0.260. The deficiency bandwidth D63 in the ONU 1-6 is 0.083. Since the sum of the surplus bandwidths is larger than the sum of the deficiency bandwidths, the surplus bandwidth can compensate the deficiency bandwidth. Thus, the deficiency bandwidth D63 is permitted as the additional bandwidth to the ONU 1-6. Thus, the actual bandwidths in the ONUs 1-5, . . . , and 1-7 are 0.100, 0.333, and 0.390, respectively.

The sum of the bandwidths distributed to each of the ONUs 1 in the wavelength $\lambda_1$, $\lambda_2$, and $\lambda_3$ may be more than 1. When one ONU 1 can communicate with only one receiver 22 at once, the upper limit of the bandwidth allocated to each of the ONUs 1 in a certain period of time is 1, and therefore, the difference between the sum of the bandwidths distributed to each of the ONUs 1 in the wavelengths $\lambda_1$, $\lambda_2$, and $\lambda_3$ and the upper limit of the bandwidth allocated to each of the ONUs 1 in a certain period of time are discarded.

In FIGS. 8 and 9, in the surplus bandwidth distribution step S8, the surplus bandwidth of each of the ONUs 1 in which the reference bandwidth is more surplus than the requested bandwidth is equally distributed to each of the ONUs 1 in which the requested bandwidth is more excess than the reference bandwidth. Accordingly, the surplus bandwidth can be distributed regardless of the difference between the reference bandwidth and the requested bandwidth and the subscription service class.

As a first variation, in the surplus bandwidth distribution step S8, the higher the subscription service class, the more the surplus bandwidth of each of the ONUs 1 in which the reference bandwidth is more surplus than the requested bandwidth may be distributed to each of the ONUs 1 in which the requested bandwidth is more excess than the reference bandwidth. Thus, the higher the subscription service class, the more the surplus bandwidth can be distributed to each of the ONUs 1.

As a second variation, in the surplus bandwidth distribution step S8, as the requested bandwidth becomes more excess than the reference bandwidth, the more surplus bandwidth of each of the ONUs 1 in which the reference bandwidth is more surplus than the requested bandwidth may be distributed to each of the ONUs 1 in which the requested bandwidth is more excess than the reference bandwidth. Accordingly, as the difference between the reference bandwidth and the requested bandwidth becomes larger, the more surplus bandwidth can be distributed to each of the ONUs 1.

INDUSTRIAL APPLICABILITY

The wavelength and bandwidth allocation method according to the present disclosure is suitable for performing suitable bandwidth allocation in a wavelength variable type WDM/TDM-PON.

REFERENCE SIGNS LIST

1 ONU
2 OLT
3 Transmission path
4 Transmission path
5 Power splitter
21 Wavelength filter
22 Receiver
23 Wavelength determining part
24 Reference bandwidth distributing part
25 Bandwidth request accepting part
26 Difference calculating part
27 Surplus bandwidth distributing part

What is claimed is:

1. A wavelength and bandwidth allocation method, which is performed by one optical line terminal (OLT) in a passive optical communication network in which a plurality of optical network units (ONUs) are connected to the OLT, each of the ONUs transmits an uplink signal of any one of a plurality of previously provided wavelengths to the OLT, and the OLT receives the uplink signals of all the previously provided wavelengths from each of the ONUs, the method comprising:
   (a) in order, before accepting a bandwidth request from each of the ONUs,
      a wavelength determination step of guaranteeing a guaranteed bandwidth corresponding to a subscription service class of each of the ONUs and determining a plurality of wavelengths of the uplink signal from each of the ONUs to the OLT so that all bandwidths of the plurality of wavelengths determined in the wavelength determination step are equal to or greater than a total of the guaranteed bandwidth,
         wherein a guaranteed bandwidth corresponding to the subscription service class of each of the ONUs is set to the bandwidth of one wavelength which is divided by a maximum number of the ONUs accommodated by the one wavelength and is multiplied by a weight of the subscription service class of each of the ONUs; and
      a reference bandwidth distribution step of distributing, as reference bandwidths, all bandwidths of the plurality of wavelengths determined in the wavelength determination step to each of the ONUs according to the subscription service class of each of the ONUs and making the reference bandwidths of the respective ONUs whose subscription service classes are the same be the same;
   (b) a bandwidth request acceptance step of accepting a bandwidth request from each of the ONUs;
   (c) a difference calculation step of calculating a difference between a requested bandwidth and the reference bandwidth of each of the ONUs and calculating a surplus bandwidth of each of the ONUs in which the reference bandwidth is greater than the requested bandwidth and an excess bandwidth of each of the ONUs in which the requested bandwidth is greater than the reference bandwidth; and
   (d) a surplus bandwidth distribution step of distributing the surplus bandwidth of each of the ONUs in which the reference bandwidth is greater than the requested bandwidth to each of the ONUs in which the requested bandwidth is greater than the reference bandwidth.

2. The wavelength and bandwidth allocation method according to claim 1, wherein in the reference bandwidth distribution step, as the subscription service class of each of the ONUs becomes higher, the reference bandwidth of each of the ONUs contains more wavelengths, and the bandwidth of each wavelength determined in the wavelength determination step is equally distributed to each of the ONUs whose reference bandwidth contains the respective wavelength determined in the wavelength determination step.

3. The wavelength and bandwidth allocation method according to claim 2, wherein in the reference bandwidth distribution step, when the number of the plurality of wavelengths determined in the wavelength determination step is smaller than the number of the subscription service classes of each of the ONUs, the bandwidth of one of the plurality of wavelengths determined in the wavelength determination step is distributed into two or more high-order subscription service classes of the ONUs according to the subscription service class of each of the ONUs.

4. The wavelength and bandwidth allocation method according to claim 1, wherein in the surplus bandwidth distribution step, the surplus bandwidth of each of the ONUs in which the reference bandwidth is greater than the requested bandwidth is equally distributed to each of the ONUs in which the requested bandwidth is greater than the reference bandwidth.

5. The wavelength and bandwidth allocation method according to claim 1, wherein in the surplus bandwidth distribution step, the surplus bandwidth of each of the ONUs in which the reference bandwidth is greater than the requested bandwidth, and the higher the subscription service class of each of the ONUs becomes, the more the surplus bandwidth is distributed to each of the ONUs.

6. The wavelength and bandwidth allocation method according to claim 1, wherein in the surplus bandwidth distribution step, the surplus bandwidth of each of the ONUs in which the reference bandwidth is greater than the requested bandwidth is distributed to each of the ONUs in which the requested bandwidth is greater than the reference bandwidth, and the greater the requested bandwidth becomes than the reference bandwidth in each of the ONUs, the more the surplus bandwidth is distributed to each of the ONUs.

7. A wavelength and bandwidth allocation method, which is performed by one optical line terminal (OLT) in a passive optical communication network in which a plurality of optical network units (ONUs) are connected to the OLT, each of the ONUs transmits an uplink signal of any one of a plurality of previously provided wavelengths to the OLT, and the OLT receives the uplink signals of all the previously provided wavelengths from each of the ONUs, the method comprising:
   (a) in order, before accepting a bandwidth request from each of the ONUs,
      a wavelength determination step of guaranteeing a guaranteed bandwidth corresponding to a subscription service class of each of the ONUs and determining a plurality of wavelengths of the uplink signal from each of the ONUs to the OLT so that all bandwidths of the plurality of wavelengths determined in the wavelength determination step are equal to or greater than a total of the guaranteed bandwidth; and a reference bandwidth distribution step of distributing, as reference bandwidths, all bandwidths of the plurality of wavelengths determined in the wavelength determination step to each of the ONUs according to the subscription service class of each of the ONUs and making the reference bandwidths of the respective ONUs whose subscription service classes are the same be the same;

(b) a bandwidth request acceptance step of accepting a bandwidth request from each of the ONUs;

(c) a difference calculation step of calculating a difference between a requested bandwidth and the reference bandwidth of each of the ONUs and calculating a surplus bandwidth of each of the ONUs in which the reference bandwidth is greater than the requested bandwidth and an excess bandwidth of each of the ONUs in which the requested bandwidth is greater than the reference bandwidth; and (d) a surplus bandwidth distribution step of distributing the surplus bandwidth of each of the ONUs in which the reference bandwidth is greater than the requested bandwidth to each of the ONUs in which the requested bandwidth is greater than the reference bandwidth.

8. The wavelength and bandwidth allocation method according to claim 7, wherein in the surplus bandwidth distribution step, the surplus bandwidth of each of the ONUs in which the reference bandwidth is greater than the requested bandwidth is equally distributed to each of the ONUs in which the requested bandwidth is greater than the reference bandwidth.

9. The wavelength and bandwidth allocation method according to claim 7, wherein in the surplus bandwidth distribution step, the surplus bandwidth of each of the ONUs in which the reference bandwidth is greater than the requested bandwidth, and the higher the subscription service class of each of the ONUs becomes, the more the surplus bandwidth is distributed to each of the ONUs.

10. The wavelength and bandwidth allocation method according to claim 7, wherein in the surplus bandwidth distribution step, the surplus bandwidth of each of the ONUs in which the reference bandwidth is greater than the requested bandwidth is distributed to each of the ONUs in which the requested bandwidth is greater than the reference bandwidth, and the greater the requested bandwidth becomes than the reference bandwidth in each of the ONUs, the more the surplus bandwidth is distributed to each of the ONUs.

11. The wavelength and bandwidth allocation method according to claim 7, wherein in the reference bandwidth distribution step, as the subscription service class of each of the ONUs becomes higher, the reference bandwidth of each of the ONUs contains more wavelengths, and the bandwidth of each wavelength determined in the wavelength determination step is equally distributed to each of the ONUs whose reference bandwidth contains the respective wavelength determined in the wavelength determination step.

12. The wavelength and bandwidth allocation method according to claim 11, wherein in the reference bandwidth distribution step, when the number of the plurality of wavelengths determined in the wavelength determination step is smaller than the number of the subscription service classes of each of the ONUs, the bandwidth of one of the plurality of wavelengths determined in the wavelength determination step is distributed into two or more high-order subscription service classes of the ONUs according to the subscription service class of each of the ONUs.

* * * * *